(12) United States Patent
Belhadjhamida et al.

(10) Patent No.: US 8,551,395 B2
(45) Date of Patent: Oct. 8, 2013

(54) SLURRY-BASED MANUFACTURE OF THIN WALL METAL COMPONENTS

(75) Inventors: Abdelhakim Belhadjhamida, Belleville (CA); Donald Williams, Kingston (CA); John Davies, Carrying Place (CA)

(73) Assignee: Kennametal Inc., Latrobe, PA (US)

( * ) Notice: Subject to any disclaimer, the term of this patent is extended or adjusted under 35 U.S.C. 154(b) by 183 days.

(21) Appl. No.: 12/994,500

(22) PCT Filed: May 28, 2009

(86) PCT No.: PCT/US2009/045521
§ 371 (c)(1),
(2), (4) Date: Nov. 24, 2010

(87) PCT Pub. No.: WO2009/146381
PCT Pub. Date: Dec. 3, 2009

(65) Prior Publication Data
US 2011/0067796 A1    Mar. 24, 2011

Related U.S. Application Data

(60) Provisional application No. 61/056,690, filed on May 28, 2008.

(51) Int. Cl.
*B22F 3/10* (2006.01)
*B22F 5/12* (2006.01)

(52) U.S. Cl.
USPC ............. 419/7; 419/9; 419/36; 419/40

(58) Field of Classification Search
USPC ................... 419/5, 7, 9, 36, 37, 40
See application file for complete search history.

(56) References Cited

U.S. PATENT DOCUMENTS

| | | | |
|---|---|---|---|
| 3,313,633 A * | 4/1967 | Longo | 106/1.05 |
| 3,343,982 A * | 9/1967 | Maxwell et al. | 427/253 |
| 3,489,555 A * | 1/1970 | Phillips et al. | 419/40 |
| 3,786,854 A * | 1/1974 | Mizuhara et al. | 164/80 |
| 4,089,682 A * | 5/1978 | Saito et al. | 75/236 |
| 4,426,248 A | 1/1984 | Jackson | |
| 4,592,780 A * | 6/1986 | Davies et al. | 75/229 |
| 4,602,954 A * | 7/1986 | Davies et al. | 75/232 |
| 4,729,871 A | 3/1988 | Morimoto | |
| 4,849,163 A * | 7/1989 | Bellis et al. | 419/3 |
| 5,405,571 A | 4/1995 | Truckner et al. | |
| 6,843,960 B2 * | 1/2005 | Krumpelt et al. | 419/6 |
| 2008/0120889 A1 * | 5/2008 | Bose et al. | 42/76.02 |

OTHER PUBLICATIONS

International Search Report, PCT/US2009/045521, dated Jul. 14, 2009, 3 pages.
Written Opinion, PCT/US2009/045521, dated Jul. 14, 2009, 9 pages.
International Preliminary Report on Patentability, PCT/US2009/045521, dated Nov. 30, 2010, 9 pages.

* cited by examiner

*Primary Examiner* — Roy King
*Assistant Examiner* — Ngoclan T Mai
(74) *Attorney, Agent, or Firm* — Matthew W. Smith, Esq.

(57) ABSTRACT

A method for preparing a metal-based part, the method comprising applying a slurry to a surface of a temporary substrate to thereby form a slurry-coated temporary substrate, wherein the slurry comprises a Co-, Ni-, or Fe-based metal-based material, a binder, and a solvent; drying the slurry-coated temporary substrate to remove the solvent and to thereby form a coating layer having green strength; heating the coating layer to remove the binder; heating the coating layer to sinter the metal-based material into a continuous metal alloy layer; and separating the substrate from the coating layer. A powder metallurgy preform comprising a powder metallurgy green coating on a preform substrate.

18 Claims, 2 Drawing Sheets

SLURRY-BASED MANUFACTURE OF THIN WALL METAL COMPONENTS

REFERENCE TO RELATED APPLICATIONS

This application is the U.S. national stage application of International Patent Application No. PCT/US2009/045521, filed May 28, 2009, and claims the benefit of U.S. Provisional Application Ser. No. 61/056,690, filed May 28, 2008, the entire disclosures of which are incorporated herein by reference.

FIELD OF THE INVENTION

The present invention generally relates to a powder metallurgy process for forming metal components having a thin wall.

BACKGROUND OF THE INVENTION

Fabrication of hard alloys into complex-shaped parts is often difficult since brittleness is commonly associated with hardness. For example, a cobalt-based alloy containing 29 weight % chromium, 4.5 weight % tungsten, 1 weight % carbon, and cobalt balance has a hardness of about HRC 42 (Rockwell C scale) but its room temperature tensile elongation is less than 1%. Such an alloy is difficult to form without cracking. It is usually used as castings or consumables for hardfacing, which often involves welding.

Certain materials do not lend themselves to welding due to metallurgical incompatibility. For example, titanium and its alloys cannot be hardfaced by weld overlaying with a cobalt-based or nickel-based hardfacing consumable since titanium tends to react with these alloys to form brittle intermetallic compounds, resulting in disbonding. Another similar example is aluminum and its alloys. Copper and its alloys are very difficult to weld on the surface due to their high heat conductivity. For polymeric materials, it is impossible to weld with metals. For wear protection, thermal spraying is often used.

Thermal spraying is capable of coating metals and polymeric materials with hard coatings. However, the coating thickness is often limited to less than 0.5 mm. Moreover, the properties of the coatings are significantly different from the original alloys since high amounts of embedded oxides are usually formed during the spraying process. Another weakness of any thermal spraying process is that it is a "line of sight" process. For example, a tube with a small ID cannot be coated by using thermal spraying methods.

Other coating methods, such as, physical vapor deposition (PVD), chemical vapor deposition (CVD) and electroplating, although not "line of sight", are limited in coating material selections and thickness.

SUMMARY OF THE INVENTION

Among the aspects of the present invention may be noted the provision of a process for forming hard alloys into complex shapes using a process that also enables formation of objects having relatively thin walls.

Briefly, therefore, the present invention is directed to a method for preparing a metal-based part comprising applying a slurry to a surface of a temporary substrate to thereby form a slurry-coated temporary substrate, wherein the slurry comprises a Co-, Ni-, or Fe-based metal-based material, a binder, and a solvent; drying the slurry-coated temporary substrate to remove the solvent and to thereby form a coating layer having green strength; heating the coating layer to remove the binder; heating the coating layer to sinter the metal-based material into a continuous metal alloy layer; and separating the substrate from the coating layer.

In another aspect the invention is directed to a powder metallurgy preform comprising a powder metallurgy green coating on a preform substrate.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE EMBODIMENT(S) OF THE INVENTION

Figure 1:
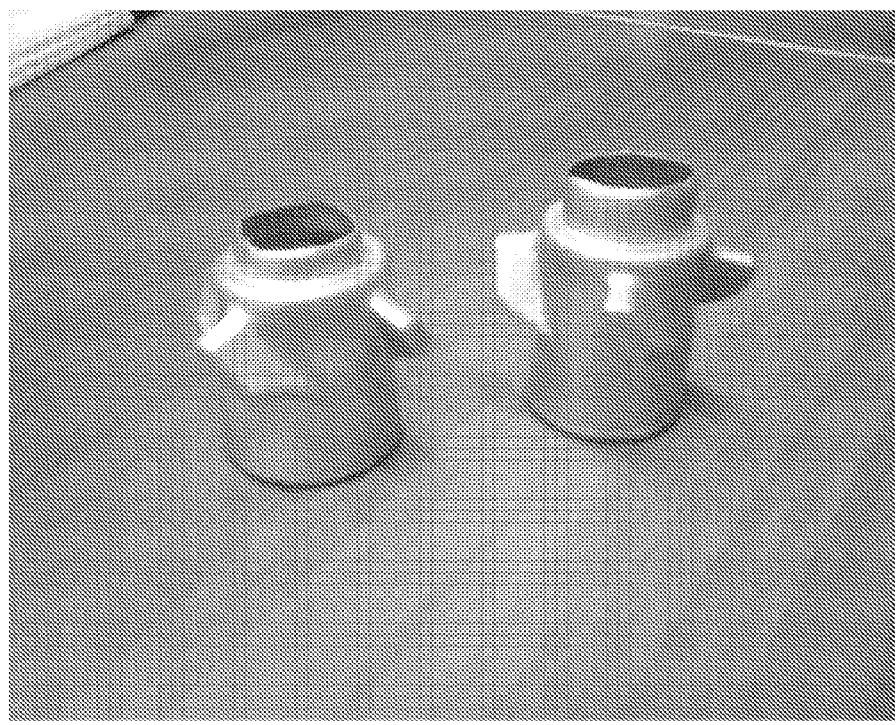
FIG. 1 is a photograph of a metallic part having a complex shape that was made according to the process of the present invention. The method is described in Example 1.

The present invention is directed to a method of using powder metallurgy to prepare metal articles having thin walls. The powders may comprise metal-based materials selected from among metals, metal-based alloys and metal-based composites. In one aspect, the present invention is directed to a method of using powder metallurgy to prepare thin-walled articles from metals, alloys, and metal-based composites that are relatively hard and brittle. Metals and alloys having high hardness are otherwise difficult to form into complex articles by conventional methods.

The method of the present invention generally involves coating a surface of a preformed substrate with a metal slurry, the slurry comprising a powder, a binder, and a solvent.

The powder may be a pure metal, an alloy of two or more metals, or a metal-based composite. A metal-based composite is a metal or alloy further comprising non-metallic materials, such as phosphorus or boron, which provide desirable properties. The slurry-coated preformed substrate is then subjected to a heat cycle, which removes the solvent and thereby forms a coating layer having green strength. Further heating is employed to remove the binder and solidify and harden (i.e., sinter) the powder into a substantially continuous coating surrounding the preformed article. Finally, the preformed article and the substantially continuous metal coating are separated in a manner that maintains the integrity of the continuous metal coating. In an alternative embodiment, the coating layer having green strength is separated from the substrate prior to further heating to remove the binder and solidify and harden (sinter) the powder into a substantially continuous coating. Both alternative processes are useful for forming a wide variety of metal and alloy powders into highly complex shapes. Advantageously, the shapes may be formed with very thin walls.

In general, the preformed substrate is a sacrificial pre-form constructed from wax, sand, plastics, a leachable ceramic, or combinations of the above. These preformed substrates may be made by traditional methods such as wax pressing or molding. Modern methods, such as, SLA (Stereolithography) and SLS (Selective Laser Sintering) may be used as well to build plastic preforms. By using highly malleable materials such as waxes and plastics, the preformed substrate may be formed into any of a nearly limitless variety of shapes, in particular, highly complex shapes.

A wide variety of waxes may be used to construct the preformed substrate. "Wax" defines a class of hydrophobic, malleable materials at normal ambient temperatures. A typical wax has a melting point above about 45° C. and has a relatively low viscosity when melted, as compared to plastics, which typically readily flow when melted. A wide variety of wax sources may be used to construct the preformed article, including animal waxes, vegetable waxes, mineral waxes, petroleum waxes, and synthetic waxes.

The preformed substrate may be constructed from waxes available from animal sources including, but not limited to: beeswax produced by honey bees; Chinese wax produced by the scale insect *Ceroplastes ceriferus*; shellac wax from the insect *Kerria lacca*; Spermaceti from the head cavities and blubber of the sperm whale; and lanolin (wool wax) from the sebaceous glands of sheep.

Alternatively, the preformed article may be constructed from waxes available from vegetable sources, including, but not limited to: bayberry wax from the surface of the berries of the bayberry shrub, *Myrica faya*; candelilla wax from the Mexican shrubs *Euphorbia cerifera* and *E. antisyphilitica*; carnauba wax from the leaves of the Carnauba palm, *Copernica cerifera*; castor wax, which is catalytically hydrogenated castor oil; esparto wax, which is a byproduct of making paper from esparto grass, (*Macrochloa tenacissima*); Japan wax, which is a vegetable triglyceride (not a true wax), from the berries of *Rhus* and *Toxicodendron* species; Jojoba oil, a replacement for spermaceti, which is pressed from the seeds of the jojoba bush, *Simmondsia chinensis*; Ouricury wax from the Brazilian Feather palm, *Syagrus coronata*; rice bran wax obtained from rice bran (*Oryza sativa*); and soy wax from soybean oil.

The preformed article may be constructed from waxes available from mineral and petroleum sources, including, but not limited to: Ceresin waxes; Montan wax extracted from lignite and brown coal; Ozocerite found in lignite beds; and Peat waxes. Petroleum waxes include paraffin wax made of long-chain alkane hydrocarbons and microcrystalline wax having very fine crystalline structure.

In still another embodiment, the preformed article may be constructed from synthetic waxes, including but not limited to: polyethylene waxes based on polyethylene; Fischer-Tropsch waxes; chemically modified waxes—usually esterified or saponified; substituted amide waxes; and polymerized α-olefins.

Preferably, the preformed article is constructed from petroleum wax, that is, paraffins and microcrystalline waxes. Paraffins define a class of long chain alkane hydrocarbons having the general formula $C_nH_{2n+2}$ wherein n is an average value ranging from about 15 to about 45, such as from about 20 to about 40, typically about 25. Paraffins have a melting point typically between about 47° C. and about 64° C. and a density of about 0.9 g/cm$^3$. Microcrystalline waxes contain a high percentage of isoparraffins (branched alkane hydrocarbons) and naphthenic hydrocarbons (cycloalkane hydrocarbons). Typically, microcrystalline waxes have higher molecular weights and thus higher melting points than paraffins.

A wide variety of plastics may be used to construct the preformed article. Plastic materials include thermoplastic, thermosetting, and elastomeric plastics. Plastics potentially applicable for use in constructing the preformed article include, but are not limited to: Polyethylene (PE); Polypropylene (PP); Polystyrene (PS); High impact polystyrene (HIPS); Acrylonitrile butadiene styrene (ABS); Polyethylene terephthalate (PET); Polyester (PES); Polyamides (PA) (Nylons); Poly(vinyl chloride) (PVC); Polyurethanes (PU); Polycarbonate (PC); Polyvinylidene chloride (PVDC) (Saran); Bayblend (PC/ABS); Celluloid and Rayon; polymethyl methacrylate (PMMA) Perspex, Oroglas, Plexiglas; Polytetrafluoroethylene (PTFE) (trade name Teflon); Polyetheretherketone (PEEK) (Polyketone); Polyetherimide (PEI) (Ultem); Phenolics (PF) or (phenol formaldehydes); Urea-formaldehyde (UF); Melamine formaldehyde (MF) (e.g. "Formica"); Polylactic acid; and Plastarch material. Preferably, the plastic is a thermoplastic, such as polyethylene, polypropylene, polystyrene, polyamide, polyacrylates, fluoroplastics, polybutylene, polycarbonate, polyesters, polyimide, polylactic acid, polysulfone, polyvinyl chloride, polyvinylidene chloride, among others.

In another embodiment, the preformed substrate may be constructed from sand, typically held together with a binder, such as a phenolic resin, i.e., one of a class of resins prepared by reacting a phenol (e.g., hydroxymethylphenols) with formaldehyde. In yet another embodiment, the preformed substrate may be constructed from a leachable ceramic, such as fused silica, which is commonly used for cores in the investment casting industry.

The sacrificial preformed substrate, once formed into the desired shape, is then dipped into a metal slurry containing metal or metal alloy powder, a solvent, and an organic binder. Additional optional components include defoaming agents and wetting agents. Multiple dips may be performed to increase the wall thickness of the final product.

The metal slurry comprises metallic powder, solvent, and a binder. The metal slurry may optionally contain a defoaming agent and a surfactant. The relative volume proportion of metallic powder and slurry in the metal slurry may be between about 30 and about 60 vol. % metallic powder and between about 40 to about 70 vol. % solvent. The relative proportion of metallic powder to solvent expressed in terms of a ratio of weight of metallic powder to weight of solvent may be from about 2:1 to about 15:1, preferably from about 3.5:1 to about 12.5:1, even more preferably from about 5:1 to about 7:1, such as about 6:1. Stated yet another way, the metallic powder may be present in the metal slurry in an amount between about 60 wt. % and about 95 wt. %, more preferably between about 75 wt. % and about 93 wt. %, even more preferably between about 83 wt. % and about 88 wt. %.

The metal slurry composition further comprises between about 0.5 and about 5 wt. % binder. Optionally, the metal slurry may comprise between about 0.05 and about 2 wt. % defoaming agent, preferably between about 0.25 and about 1 wt. % defoaming agent. Optionally, the metal slurry may further comprise between about 0.05 and about 2 wt. % wetting agent, preferably between about 0.25 and about 1 wt. % wetting agent. The metal slurry is preferably aqueous in that water is the predominant or even the only solvent, although alcohols such as methanol, ethanol, propanols, and butanols may be used as supplementary solvents, as the primary solvent, or even as the only solvent.

Applicable metal and metal alloys that may be added as powders to the slurry include cobalt-based alloys, nickel-based alloys, and iron-based alloys. Metals and alloys potentially applicable include any that are available in powder form, wherein the powder particles can bond to each other by sintering, when heat is applied.

Certain wear and corrosion resistant cobalt-based and nickel-based alloys are distributed by Deloro Stellite Company, Inc. under the trade designations Stellite® and Tribaloy®. In one embodiment, the powder employed in the invention is a Co-based alloy, which may be alloyed with nickel, iron, chromium, manganese, molybdenum, and tungsten. Non-metallics may be added to the Co-based alloys, including carbon, boron, phosphorus, sulfur, and silicon.

In one embodiment, the Co-based alloy comprises Cr and W as major components and may further comprise Ni, Fe, C, Mn, Si, and Mo in relatively low or trace amounts. For example, the Co-based alloy may comprise between about 21 wt % and about 35 wt % Cr, between about 4 wt % and about 19 wt % W, up to about 3 wt % Ni, up to about 5 wt % Fe, between about 0.4 wt % and about 3.5 wt % C, up to about 1.5 wt % Mn, between about 0.1 wt % and about 1.5 wt % Si, and up to about 1.5 wt % Mo, and the balance Co. Exemplary Stellite® alloys within this group include Stellite® 1, Stellite® 1C, Stellite® 3, Stellite® 4, Stellite® 4B, Stellite® 4LC, Stellite® 6, Stellite® 7, Stellite® 12, Stellite® 19, Stellite® 20, Stellite® 33, Stellite® 35, Stellite® 95, Stellite® 98M2, Stellite® 100, Stellite® 152, Stellite® 156, Stellite® 157, Stellite® 190, Stellite® 506, Stellite® 694, Stellite® Star J, among others. Stellite® 3, for example, has a nominal composition of 2.45 wt % C, 31 wt % Cr, 1 wt. % Mn, 1 wt % Si, and 13 wt % W, and may comprise up to 3 wt % Ni and Fe.

In one embodiment, the Co-based alloy comprises Cr, W, and Ni as major components and may further comprise Fe, C, Mn, Si, and Mo in relatively low or trace amounts. For example, the Co-based alloy may comprise between about 20 wt % and about 35 wt % Cr, between about 2 wt % and about 15 wt % W, between about 6 wt % and about 24 wt % Ni, up to about 4 wt % Fe, between about 0.1 wt % and about 2 wt % C, up to about 1.5 wt % Mn, between about 0.3 wt % and about 3 wt % Si, up to about 3 wt % B, and the balance Co. Exemplary Stellite® alloys within this group include Stellite® 25, Stellite® 31, Stellite® 36, Stellite® 107, Stellite® 188, Stellite® 306, Stellite® F, Stellite® SF1, Stellite® SF6, Stellite® SF12, Stellite® SF20, among others.

In another embodiment, the Co-based alloy comprises Cr and Mo as major components and may further comprise Ni, Fe, C, Mn, and Si in relatively low or trace amounts. For example, the Co-based alloy may comprise between about 26 wt % and about 34 wt % Cr, between about 4 wt % and about 18 wt % Mo, up to about 3 wt % Ni, up to about 3 wt % Fe, between about 0.2 wt % and about 3 wt % C, up to about 1.5 wt % Mn, between about 0.5 wt % and about 1.5 wt % Si, up to about 0.5 wt % B, and the balance Co. Exemplary Stellite® alloys within this group include Stellite® 21, Stellite® 701, Stellite® 703, Stellite® 704, Stellite® 706, Stellite® 712, Stellite® 720, Stellite® 790, among others.

Still other Co-based alloys may be employed, having relatively higher proportions of iron and nickel. For example, the cobalt-based alloy may comprise between about 8 wt % and about 20 wt % Fe and/or between about 1 wt % and about 8 wt % Ni. These alloys may further comprise between about 26 wt % and about 33 wt % Cr, up to about 14 wt % Mo, between about 0.1 wt % and about 3.5 wt % C, up to about 1 wt % Mn, and up to about 1.5 wt % Si. Exemplary Stellite® alloys within this group include Stellite® 208, Stellite® 238, Stellite® 250, Stellite® 251, Stellite® 2006, Stellite® 2012, and Stellite® 6113, among others.

Alloys within the Tribaloy® alloy family are disclosed in U.S. Pat. Nos. 3,410,732; 3,795,430; 3,839,024; and in pending U.S. application Ser. No. 10/250,205. Specific alloys in the cobalt-based Tribaloy® family are distributed under the trade designations T-400, T-800, T-400C, T-401 and T-900. Tribaloy® alloys typically comprise between about 8 and about 18 wt % Cr, between about 20 and about 33 wt % Mo, between about 0.5 and about 4 wt % Si, balance cobalt, but other components, such as iron, nickel, and vanadium may be present, typically in amounts between about 0.5 and about 3 wt %. The nominal composition of T-400 is Cr-8.5%, Mo-29 wt %, Si-2.6 wt %, and balance Co. The nominal composition of T-800 is Cr-18 wt %, Mo-28 wt %, Si-3.4 wt %, and balance Co. The nominal composition of T-400C is Cr-14 wt %, Mo-26 wt %, Si-2.6 wt %, and balance Co. The nominal composition of T-900 is Ni-16 wt %, Cr-18 wt %, Mo-25 wt %, Si-2.7 wt %, and balance Co. The nominal composition of T-401 is Cr-16 wt %, Mo-22 wt %, Si-1.2 wt %, and balance Co.

Nickel-based alloys include Tribaloy® T-700 and Tribaloy® T-745 comprising between about 14 and 28 wt % Cr, between about 24 and about 34 wt % Mo, between about 1 and about 4 wt % Si, up to about 0.1 wt % C, up to about 3 wt % Fe, up to about 2 wt % Co, the balance being Ni. The nominal composition of T-700 is 1.5 wt % Co, 15.5 wt % Cr, 32.5 wt % Mo, 3.4 wt % Si, and the balance Ni. The nominal composition of T-745 is 26 wt % Cr, 26 wt % Mo, 1.5 wt % Si, and the balance Ni.

Additional nickel-based alloys are sold under the trade name Deloro®, and they typically comprise between about 0.2 and about 6 wt %. Fe, between about 0.5 and about 4 wt %. B, between about 1 and about 5 wt. % Si, and between about 0.03 to about 1 wt. % C, with the balance being Ni. Optional components include Co, Al, Cr, Mo, Mn, and W. Exemplary Deloro® alloys include Deloro® 15, Deloro® 21, Deloro® 22, Deloro® 23, Deloro® 25, Deloro® 30, Deloro® 33, Deloro® 35, Deloro® 38, Deloro® 40, Deloro® 45, Deloro® 46, Deloro® 49, Deloro® 50, Deloro® 55, Deloro® 56, Deloro® 60, Deloro® 62, Deloro® 75, Deloro® 90, Deloro® 99, Deloro® 711, and Deloro® 721.

In one embodiment, the powder employed in the invention is an iron-based alloy, which may be alloyed with cobalt, chromium, manganese, molybdenum, and tungsten. Non-metallics may be added to the Co-based alloys, including carbon and silicon.

Iron-based alloys are available from Deloro Stellite Company, Inc. under the trade name Delcrome®, and they may comprise between about 4 and about 10 wt. % Co, between about 0.6 and about 5 wt. % C, between about 2 and about 30 wt. % Cr, between about 0.1 and about 4 wt. % Mn, between about 4 and about 22 wt. % Mo, between about 0.5 and about 3 wt. % Si, and between about 3 and about 9 wt. % W. The nominal composition of Delcrome® 93, for example, is 6 wt. % Co, 3 wt. % C, 17 wt. % Cr, 1 wt. % Mn, 16 wt. % Mo, 1.5 wt. % Si, the balance Fe. The nominal composition of Delcrome® 200, for example, is 0.8 wt. % C, 4 wt. % Cr, 5 wt. % Mo, 6 wt. % W, the balance Fe.

The metals, alloys, and metal-based composites described above are added to the slurry as powders. In the currently preferred embodiments, they are added as pre-alloyed powders. In embodiments wherein a fully dense or nearly fully dense finished article is desired, the powders are preferably very fine. Herein, the metal and metal alloy powders preferably have a mesh size of −70 (less than about 210 micrometers), more preferably a mesh size of −140 (less than about 105 micrometers), even more preferably about −200 (less than about 74 micrometers), such as about −270 (less than about 53 micrometers). In embodiments wherein the densification of the product is not as critical, larger particles may be used, such as about −35 (less than about 500 micrometers), −45 (less than 354 micrometers), −60 (less than 250 micrometers, or even −70 (less than 210 micrometers). Powders having the above particle sizes may be formed by means known in the art, including milling, atomization, chemical deposition, and other methods.

The metal slurry further comprises a binder, which may be selected from among methyl cellulose, polyvinyl alcohol, and polyvinyl butyrol, acrylic, among others. Applicable binders are materials that have the ability to bind to the pre-form material and the metal powders, such that when the metal slurry is applied, the binder holds the metal powders together and to the surface of the preformed article. The binder evaporates at a temperature below the sintering temperature of the metal alloy powder.

The metal slurry may optionally comprise a defoaming agent. A defoaming agent is generally preferred to reduce or eliminate air bubbles that may be formed during slurry preparation and to ensure complete coverage of the preformed substrate during coating. Defoaming agents useful for adding to the metal slurry include silicone emulsions, i.e., aqueous emulsions comprising polymerized siloxanes, for example polydimethylsiloxane (dimethicone). Silicone emulsions are available from a wide variety of commercial sources, including Defoam FG-10 available from Syndel Laboratories LTD., DCH-10 Antifoam available from Ransom & Randolph, Supreme Silicones Antifoam Emulsion, Silicone Emulsion from M.R. Silicone Industries, Silicone Concentrates from ClearCo Products, Dow Corning DSP Antifoam Emulsion, and so forth.

The metal slurry may optionally comprise a wetting agent, which aids in wetting the surface of the preformed article during coating, particularly hydrophobic waxes and plastics. Applicable wetting agents include non-ionic surfactants such as those comprising polyether groups, based on, for example, ethylene oxide (EO) repeat units and/or propylene oxide (PO) repeat units. These surfactants may comprise blocks of EO repeat units and PO repeat units, for example, a block of EO repeat units encompassed by two blocks of PO repeat units or a block of PO repeat units encompassed by two blocks of EO repeat units. Another class of polyether surfactants comprises alternating PO and EO repeat units. Within these classes of surfactants are the polyethylene glycols, polypropylene glycols, and the polypropylene glycol/polyethylene glycols.

Yet another class of non-ionic surfactants comprises EO, PO, or EO/PO repeat units built upon an alcohol or phenol base group, such as glycerol ethers, butanol ethers, pentanol ethers, hexanol ethers, heptanol ethers, octanol ethers, nonanol ethers, decanol ethers, dodecanol ethers, tetradecanol ethers, phenol ethers, alkyl substituted phenol ethers, α-naphthol ethers, and β-naphthol ethers.

Non-ionic wetting agents are available from a wide variety of commercial sources. For example, a β-naphthol derivative non-ionic surfactant is Lugalvan BNO12 which is a β-naphtholethoxylate having 12 ethylene oxide monomer units bonded to the naphthol hydroxyl group. A similar surfactant is Polymax NPA-15, which is a polyethoxylated nonylphenol. Polyethoxylated nonylphenols are also sold under the Tergitol® trade name by Dow Chemical. Another surfactant is Triton®-X100 nonionic surfactant, which is an octylphenol ethoxylate. Additional commercially available non-ionic surfactants include the Pluronic® series of surfactants of EO/PO block copolymers, available from BASF. Another class of nonionic polyether surfactants includes low foaming surfactants, such as the Triton CF series. Nonionic surfactants are also available from Ransom & Randolph, including Wet-it and from Akzo Nobel, such as the Berol series of alcohol ethoxylates.

The order of component addition during metal slurry preparation is not narrowly critical to the efficacy of the invention. Typically, the metal powder is added to the solvent, followed by the binder, but the order of addition may vary. The slurry composition is generally prepared with mixing, such as with a magnetic stir bar, stirring rod or paddle, or with agitation, such as with a shaker or paint mixer. The slurry is stirred or mixed for a duration sufficient to homogenize the slurry. The metal slurry may be prepared in any ambient atmosphere and pressure, although applying a vacuum is advantageous for removing air bubbles.

Prior to coating with metal slurry, the preformed substrate is preferably cleaned from any foreign materials that may contaminate the slurry. Moreover, if the preformed substrate is made from sand, it is preferable to ensure that loose sand particles are wiped from the surface to avoid contaminating the metal slurry.

The surface of the preformed substrate may be coated with the metal slurry by a variety of methods, such as immersion by dipping, spraying, cascading, or other means as are known. Preferably, the preformed substrate is simply dipped into the metal slurry. The metal slurry may be maintained at any temperature during slurry coating, and, if the solvent is water, room temperature is preferred. Preferably, the metal slurry is agitated when the preformed substrate is submerged in the slurry to achieve even coating. The preformed substrate may be dipped once or more than once (i.e., twice, three times, four times, or more) to enhance the coating thickness. Preferably, the preformed substrate is not rinsed between dips. Dipping in this manner may be used to coat the preformed substrate with a slurry coating as thin about 50 micrometers to as thick as about 20 millimeters with preferred thickness for thin walled articles between about 100 micrometers and about 10 millimeters, or between about 100 micrometers and about 5 millimeters, or between about 100 micrometers and about 1 millimeter.

A preformed substrate may be coated with slurry to the desired thickness, according to the method of the present invention, in as little as three seconds.

After the dipping stage, the slurry coated preformed substrate is dried to remove the solvent. Drying may occur in air at room temperature, and the solvent may be substantially evaporated within a few hours. Drying may be expedited to as little as a few minutes by increasing the temperature, such as up to about 60° C., by applying a vacuum, or by blow drying, but these steps are not necessary for achieving a fully densified, high quality final product. Solvent removal yields a coating layer having green strength, i.e., the coating layer has sufficient tensile strength to be removed from the preformed substrate without undergoing distortion.

After solvent evaporation, the coated preformed substrate is subject to a heat cycle to remove the binder, to sinter the metal into a continuous, densified metal layer, and, optionally, to separate the preformed substrate from the densified metal or metal alloy coating. In embodiments wherein the preformed substrate is made of wax or plastic, the heat cycle may comprise heating steps or continuous temperatures increases to (i) remove the binder, (ii) melt and thereby remove the preformed substrate, and finally, (iii) sinter the metal or metal alloy particles into a densified shell. As a general proposition, wax substrates are removed prior to and during the removal of the binder because the waxes are volatilized at temperatures slightly less than and/or overlapping with the binder volatilization temperatures. And plastic substrates are removed after removal of the binder because the plastics employed are volatilized at temperatures slightly less than and/or overlapping with the binder volatilization temperatures. So in some embodiments, the preformed substrate is melted and removed from the coating layer having green strength prior to removal (i.e., evaporation) of the binder.

In one exemplary embodiment, the heat cycle may comprise a low temperature portion, such as between about 200° C. and about 500° C. wherein the binder is evaporated, a mid-temperature portion between about 300° C. and about 600° C. to thereby melt and remove the preformed substrate from the green coating, followed by a high temperature portion, such as between about 1000° C. and about 1350° C., wherein the metal or metal alloy powders are sintered and densified. Bonding is accomplished by way of diffusion (i.e., atomic migration between powder particles), and the process affirmatively avoids super-liquidus melting. Plastics typically require slightly higher temperatures than waxes to melt and to be removed from the green coating layer. In one embodiment, the temperature may be sufficient to both evaporate the binder and to melt and thereby remove the preformed substrate in a single step.

In embodiments wherein the preformed substrate is constructed from sand or leachable ceramic, the heat cycle comprises a low temperature portion to evaporate the binder and a high temperature portion to sinter and densify the metal or metal alloy powders. Ceramic and sand preformed substrates are particularly advantageous since they prevent the shell from buckling and distorting due to shrinkage when densification of the powdered material is desired. Upon completion of the heat cycle, the sand or ceramic preformed substrate is removed mechanically or chemically, such as with a sodium hydroxide solution.

In steps wherein the preformed substrate is removed prior to sintering, the thin-walled part can be considered as a shell having green strength sufficient to resist distortion. The shell is then subjected to a high temperature process to cause solid state diffusion between the metal particles to form a rigid component. Depending on the final density desired, the sintering temperature can be increased such as above the solidus temperature of the powdered material to achieve full densification of the shell.

The shells made with the process described above can have a wall thickness as thin as 100 micrometers, or even as thin as 50 micrometers. Thin walled articles prepared according to the method described herein have a variety of industrial uses. These shells can be further machined or used as is. They can also be used to encapsulate soft materials, either metals or plastics. Low melting point materials, such as aluminum, can be liquefied and poured in the shells. Metallurgically incompatible alloys can be brazed on the shells. For example, soft aluminum or titanium alloys can be covered by wear resistant cobalt alloys.

Alloys difficult to weld overlay, such as, copper alloys, can be encapsulated by wear resistant cobalt alloys. In addition, certain nickel superalloys that need to have enhanced wear resistance can be covered by a cobalt alloy. With the current technology, weld overlaying cobalt alloys on nickel superalloys requires high preheating and tight process control to avoid cracking. For example, weld overlaying Tribaloy® T-400 (CoMoCrSi) onto Rene 80A diesel engine valves continues to be challenging in the industry. High dilution is often resulted in the overlay and thereby, reducing the performance of the overlay alloy. Using the invention process, a fully dense, non-diluted alloy with uniform microstructure can maximize the performance.

Having described the invention in detail, it will be apparent that modifications and variations are possible without departing from the scope of the invention defined in the appended claims.

EXAMPLES

The following non-limiting examples are provided to further illustrate the present invention.

Example 1

Complex, Thin-Walled Article Formed by the Process of the Present Invention

FIG. 1 is a photograph of an article having a complex shape made from applying a slurry comprising Stellite® 3 powder to a paraffin wax preformed substrate.

The slurry comprised metal particles and water in a concentration ratio (wt %) of 6:1. The methylcellulose binder was added to a concentration equal to 0.75 wt % of the metal powder. The slurry composition additionally comprised 0.5 wt % defoaming agent and 0.5 wt % wetting agents. The preformed article was dipped into the slurry twice to apply a coating having a thickness of about 500 micrometers.

The coated preformed substrate was dried in air to evaporate the water solvent, and heated to 150° C. at a rate of 3° C./minute to remove the wax. The coated preformed substrate was then heated to 500° C. at a rate of 3° C./minute to remove the binder. The shell was held at 500° C. for 1 hour and then heated to the sintering temperature (1190° C.) held for 1 hour and cooled in the furnace.

Stellite® 3 has a hardness (Rockwell C scale) as cast (sand cast, investment cast) of 52, which may be increased by heat treatment. By comparison, the shell prepared according to the method described above according to the present invention had a hardness (Rockwell C scale) of 52. Moreover, the final density (8.674 g/cm$^3$) of the shell was 99.8% of theoretical density (8.691 g/cm$^3$).

Example 2

Complex, Thin-walled Article Formed by the Process of the Present Invention

Figure 2:
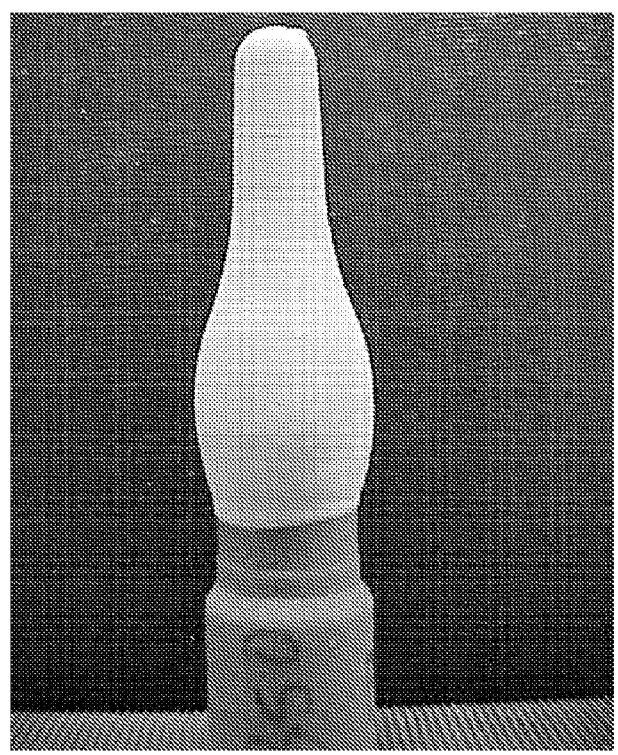
FIG. 2 is a photograph of a ceramic preformed substrate covered with metal slurry. The method of forming this article is described in Example 2.
Figure 3A:
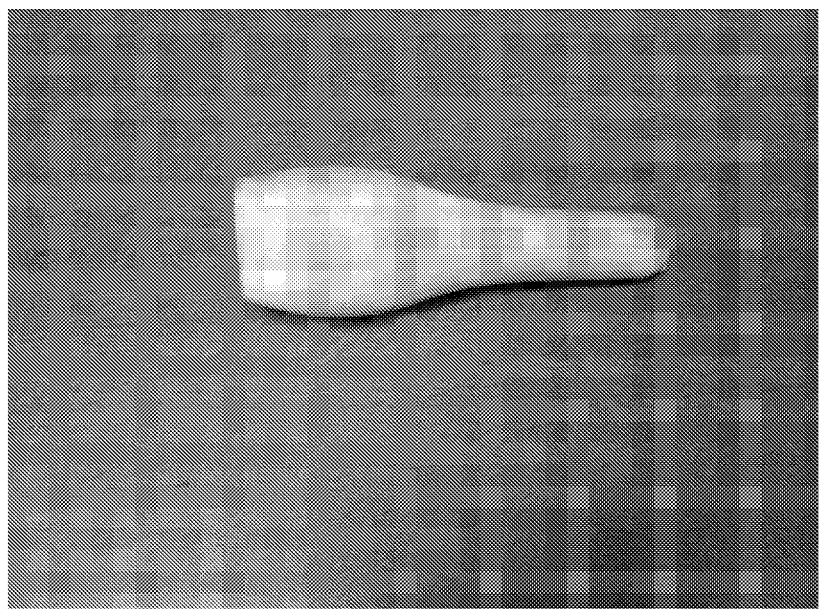
FIGS. 3A and 3B are photographs of the fully densified shell after sintering the article shown in FIG. 2 and removing the ceramic preformed substrate.
Figure 3B:
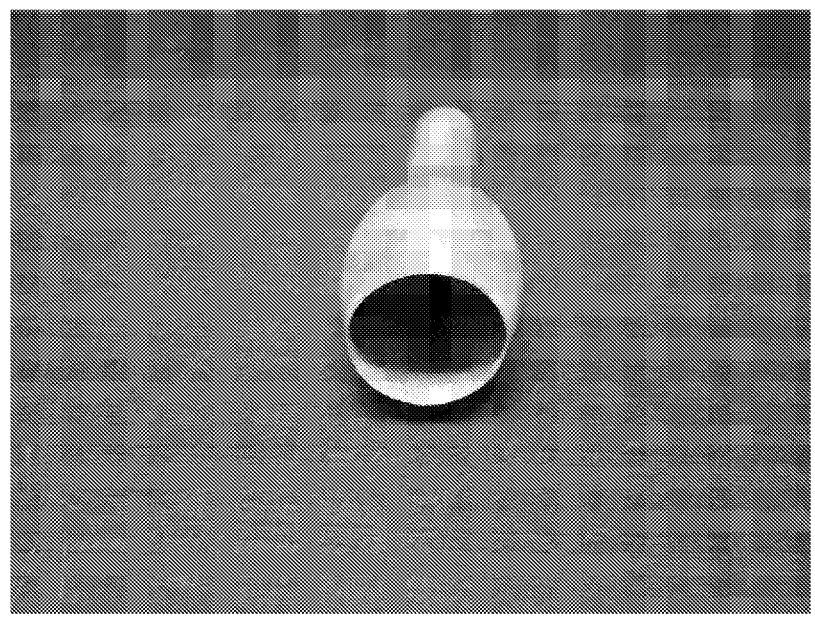

FIG. 2 is a photograph of a ceramic preformed article covered with metal slurry, and FIGS. 3A and 3B are photographs showing different views of the fully densified shell after sintering the article shown in FIG. 2. The metal powder used to form the shell shown in FIGS. 3A and 3B was Tribaloy® T400.

The slurry comprised metal particles and water in a concentration ratio (wt %) of 6:1. The methylcellulose binder was added to a concentration equal to 1 wt % of the metal powder.

The slurry composition additionally comprised 0.5 wt % defoaming agent and 0.5 wt % wetting agents. The preformed article was dipped into the slurry twice to apply a coating having a thickness of about 500 micrometers.

The coated preformed substrate was dried in air to evaporate the water solvent. The coated preformed substrate was then heated to 500° C. at a rate of 3° C./minute to remove the binder. The coated ceramic core was held at 500° C. for 1 hour and then heated to the sintering temperature of 1250° C. and held for 1 hour. The coated ceramic core was cooled in the furnace, leaving a sintered Tribaloy® T400 coating on the ceramic core. The ceramic core was removed by mechanical agitation.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A method for preparing a metal-based part, the method comprising:
   (i) applying a slurry to a surface of a temporary substrate to thereby form a slurry-coated temporary substrate, wherein the slurry comprises a metal-based material, a binder, and a solvent;
   (ii) drying the slurry-coated temporary substrate to remove the solvent and to thereby form a coating layer having green strength;
   (iii) heating the coating layer to remove the binder;
   (iv) heating the coating layer to sinter the metal-based material into a continuous metal alloy layer; and
   (v) separating the substrate from the coating layer;
   wherein the metal-based material is a Co-based alloy comprising between about 21 wt % and about 35 wt % Cr, between about 4 wt % and about 19 wt % W, up to about 3 wt % Ni, up to about 5 wt % Fe, between about 0.4 wt % and about 3.5 wt % C, up to about 1.5 wt % Mn, between about 0.1 wt % and about 1.5 wt % Si, and up to about 1.5 wt % Mo, and the balance Co, and wherein the sintering is performed at a temperature above the solidus and below the liquidus of the alloy.

2. The method of claim 1 wherein step (iv) occurs before step (v).

3. The method of claim 1 wherein step (v) occurs before step (iv).

4. The method of claim 1 wherein the slurry comprises between about 60 and about 95 wt % of the metal-based material powder, between about 0.5 and about 5 wt % of the binder, and the solvent.

5. The method of claim 1 comprising:
   (i) applying the slurry to the surface of the temporary substrate to thereby form the slurry-coated temporary substrate, wherein the slurry comprises between about 60 and about 95 wt % of the Co-based material as pre-alloyed powder, between about 0.5 and about 5 wt % of the binder, and the solvent;
   (ii) drying the slurry-coated temporary substrate at a temperature up to about 60° C. to remove the solvent and to thereby form a coating layer having green strength;
   (iii) heating the coating layer to a temperature between about 200° C. and about 500° C. to remove the binder;
   (iv) heating the coating layer to a temperature between about 1000° C. and about 1350° C. to sinter the metal-based material into a continuous metal alloy layer; and
   (v) separating the temporary substrate from the coating layer after step (iv).

6. The method of claim 1 comprising:
   (i) applying the slurry to the surface of the temporary substrate to thereby form the slurry-coated temporary substrate, wherein the slurry comprises between about 60 and about 95 wt % of the Co-based material as pre-alloyed powder, between about 0.5 and about 5 wt % of the binder, and the solvent, and wherein the temporary substrate is sand or ceramic;
   (ii) drying the slurry-coated temporary substrate at a temperature up to about 60° C. to remove the solvent and to thereby form a coating layer having green strength;
   (iii) heating the coating layer to a temperature between about 200° C. and about 500° C. to remove the binder;
   (iv) heating the coating layer to a temperature between about 1000° C. and about 1350° C. to sinter the metal-based material into a continuous metal alloy layer; and
   (v) separating the temporary substrate from the coating layer after step (iv).

7. The method of claim 1 comprising:
   (i) applying the slurry to the surface of the temporary substrate to thereby form the slurry-coated temporary substrate, wherein the slurry comprises between about 60 and about 95 wt % of the Co-based material as pre-alloyed powder, between about 0.5 and about 5 wt % of the binder, and the solvent, and wherein the temporary substrate is wax;
   (ii) drying the slurry-coated temporary substrate at a temperature up to about 60° C. to remove the solvent and to thereby form a coating layer having green strength;
   (iii) heating the coating layer to a temperature between about 200° C. and about 500° C. to remove the binder;
   (iv) heating the coating layer to a temperature between about 1000° C. and about 1350° C. to sinter the metal-based material into a continuous metal alloy layer; and
   (v) separating the temporary substrate from the coating layer before and during step (iii) by heating the coated temporary substrate to a temperature between about 200° C. and about 600° C.

8. The method of claim 1 comprising:
   (i) applying the slurry to the surface of the temporary substrate to thereby form the slurry-coated temporary substrate, wherein the slurry comprises between about 60 and about 95 wt % of the Co-based material as pre-alloyed powder, between about 0.5 and about 5 wt % of the binder, and the solvent, and wherein the temporary substrate is plastic;
   (ii) drying the slurry-coated temporary substrate at a temperature up to about 60° C. to remove the solvent and to thereby form a coating layer having green strength;
   (iii) heating the coating layer to a temperature between about 200° C. and about 500° C. to remove the binder;
   (iv) heating the coating layer to a temperature between about 1000° C. and about 1350° C. to sinter the metal-based material into a continuous metal alloy layer; and
   (v) separating the temporary substrate from the coating layer after step (iii) and before step (iv) by heating the coated temporary substrate to a temperature between about 300° C. and about 600° C.

9. The method of claim 1 wherein the applying the slurry to the temporary substrate comprises dipping the temporary substrate in the slurry more than once without rinsing between dips to yield a slurry coating having a thickness between about 50 micrometers and 20 millimeters.

10. A method for preparing a metal-based part, the method comprising:
   (i) applying a slurry to a surface of a temporary substrate to thereby form a slurry-coated temporary substrate, wherein the slurry comprises a metal-based material, a binder, and a solvent;
   (ii) drying the slurry-coated temporary substrate to remove the solvent and to thereby form a coating layer having green strength;
   (iii) heating the coating layer to remove the binder;
   (iv) heating the coating layer to sinter the metal-based material into a continuous metal alloy layer; and
   (v) separating the substrate from the coating layer;
   wherein the metal-based material is a Co-based alloy comprising between about 20 wt % and about 35 wt % Cr, between about 2 wt % and about 15 wt % W, between about 6 wt % and about 24 wt % Ni, up to about 4 wt %

Fe, between about 0.1 wt % and about 2 wt % C, up to about 1.5 wt % Mn, between about 0.3 wt % and about 3 wt % Si, up to about 3 wt % B, and the balance Co, and wherein the sintering is performed at a temperature above the solidus and below the liquidus of the alloy.

11. The method of claim 10 wherein step (iv) occurs before step (v).

12. The method of claim 10 wherein step (v) occurs before step (iv).

13. The method of claim 10 wherein the slurry comprises between about 60 and about 95 wt % of the metal-based material powder, between about 0.5 and about 5 wt % of the binder, and the solvent.

14. The method of claim 10 comprising:
   (i) applying the slurry to the surface of the temporary substrate to thereby form the slurry-coated temporary substrate, wherein the slurry comprises between about 60 and about 95 wt % of the Co-based material as pre-alloyed powder, between about 0.5 and about 5 wt % of the binder, and the solvent;
   (ii) drying the slurry-coated temporary substrate at a temperature up to about 60° C. to remove the solvent and to thereby form a coating layer having green strength;
   (iii) heating the coating layer to a temperature between about 200° C. and about 500° C. to remove the binder;
   (iv) heating the coating layer to a temperature between about 1000° C. and about 1350° C. to sinter the metal-based material into a continuous metal alloy layer; and
   (v) separating the temporary substrate from the coating layer after step (iv).

15. The method of claim 10 comprising:
   (i) applying the slurry to the surface of the temporary substrate to thereby form the slurry-coated temporary substrate, wherein the slurry comprises between about 60 and about 95 wt % of the Co-based material as pre-alloyed powder, between about 0.5 and about 5 wt % of the binder, and the solvent, and wherein the temporary substrate is sand or ceramic;
   (ii) drying the slurry-coated temporary substrate at a temperature up to about 60° C. to remove the solvent and to thereby form a coating layer having green strength;
   (iii) heating the coating layer to a temperature between about 200° C. and about 500° C. to remove the binder;
   (iv) heating the coating layer to a temperature between about 1000° C. and about 1350° C. to sinter the metal-based material into a continuous metal alloy layer; and
   (v) separating the temporary substrate from the coating layer after step (iv).

16. The method of claim 10 comprising:
   (i) applying the slurry to the surface of the temporary substrate to thereby form the slurry-coated temporary substrate, wherein the slurry comprises between about 60 and about 95 wt % of the Co-based material as pre-alloyed powder, between about 0.5 and about 5 wt % of the binder, and the solvent, and wherein the temporary substrate is wax;
   (ii) drying the slurry-coated temporary substrate at a temperature up to about 60° C. to remove the solvent and to thereby form a coating layer having green strength;
   (iii) heating the coating layer to a temperature between about 200° C. and about 500° C. to remove the binder;
   (iv) heating the coating layer to a temperature between about 1000° C. and about 1350° C. to sinter the metal-based material into a continuous metal alloy layer; and
   (v) separating the temporary substrate from the coating layer before and during step (iii) by heating the coated temporary substrate to a temperature between about 200° C. and about 600° C.

17. The method of claim 10 comprising:
   (i) applying the slurry to the surface of the temporary substrate to thereby form the slurry-coated temporary substrate, wherein the slurry comprises between about 60 and about 95 wt % of the Co-based material as pre-alloyed powder, between about 0.5 and about 5 wt % of the binder, and the solvent, and wherein the temporary substrate is plastic;
   (ii) drying the slurry-coated temporary substrate at a temperature up to about 60° C. to remove the solvent and to thereby form a coating layer having green strength;
   (iii) heating the coating layer to a temperature between about 200° C. and about 500° C. to remove the binder;
   (iv) heating the coating layer to a temperature between about 1000° C. and about 1350° C. to sinter the metal-based material into a continuous metal alloy layer; and
   (v) separating the temporary substrate from the coating layer after step (iii) and before step (iv) by heating the coated temporary substrate to a temperature between about 300° C. and about 600° C.

18. The method of claim 10 wherein the applying the slurry to the temporary substrate comprises dipping the temporary substrate in the slurry more than once without rinsing between dips to yield a slurry coating having a thickness between about 50 micrometers and 20 millimeters.

* * * * *